United States Patent
Ye et al.

(10) Patent No.: US 9,734,419 B1
(45) Date of Patent: Aug. 15, 2017

(54) SYSTEM AND METHOD FOR VALIDATING CAMERA CALIBRATION IN A VISION SYSTEM

(75) Inventors: Xiangyun Ye, Framingham, MA (US); Aaron S. Wallack, Natick, MA (US); Guruprasad Shivaram, Chestnut Hill, MA (US); Cyril C. Marrion, Acton, MA (US); David Y. Li, West Roxbury, MA (US)

(73) Assignee: COGNEX CORPORATION, Natick, MA (US)

( * ) Notice: Subject to any disclaimer, the term of this patent is extended or adjusted under 35 U.S.C. 154(b) by 837 days.

(21) Appl. No.: 12/346,773

(22) Filed: Dec. 30, 2008

(51) Int. Cl.
  *G06K 9/20* (2006.01)
(52) U.S. Cl.
  CPC .................................... *G06K 9/209* (2013.01)
(58) Field of Classification Search
  CPC ............................. G06K 2209/40; G06K 9/00
  USPC ........................................................ 348/135
  See application file for complete search history.

(56) References Cited

U.S. PATENT DOCUMENTS

| | | |
|---|---|---|
| 5,742,037 A | 4/1998 | Scola et al. |
| 5,859,924 A | 1/1999 | Liu et al. |
| 5,918,196 A | 6/1999 | Jacobson |
| 5,960,125 A | 9/1999 | Michael et al. |
| 5,978,080 A | 11/1999 | Michael et al. |
| 5,978,502 A | 11/1999 | Ohashi |

(Continued)

FOREIGN PATENT DOCUMENTS

| | | |
|---|---|---|
| EP | 0265302 | 9/1987 |
| EP | 0341122 | 4/1989 |

(Continued)

OTHER PUBLICATIONS

Faugeras et al, "The Representation, Recognition, and Locating of 3-D Objects", 1986, pp. 27-52, vol. 5, No. 3, Publisher: Massachusetts Institute of Technology, Published in: Massachusetts (Continued)

*Primary Examiner* — Obafemi Sosanya
(74) *Attorney, Agent, or Firm* — Loginov IP

(57) ABSTRACT

This invention provides a system and method to validate the accuracy of camera calibration in a single or multiple-camera embodiment, utilizing either 2D cameras or 3D imaging sensors. It relies upon an initial calibration process that generates and stores camera calibration parameters and residual statistics based upon images of a first calibration object. A subsequent validation process (a) acquires images of the first calibration object or a second calibration object having a known pattern and dimensions; (b) extracts features of the images of the first calibration object or the second calibration object; (c) predicts positions expected of features of the first calibration object or the second calibration object using the camera calibration parameters; and (d) computes a set of discrepancies between positions of the extracted features and the predicted positions of the features. The validation process then uses the computed set of discrepancies in a decision process that determines whether at least one of the discrepancies exceeds a predetermined threshold value. If so, recalibration is required. Where multiple cameras are employed, extrinsic parameters are determined and used in conjunction with the intrinsics.

25 Claims, 9 Drawing Sheets

(56) References Cited

U.S. PATENT DOCUMENTS

| | | |
|---|---|---|
| 5,978,521 A | 11/1999 | Wallack et al. |
| 6,005,965 A | 12/1999 | Tsuda et al. |
| 6,026,172 A | 2/2000 | Lewis, Jr. et al. |
| 6,166,811 A | 12/2000 | Long et al. |
| 6,301,396 B1 | 10/2001 | Michael |
| 6,357,588 B1 | 3/2002 | Room et al. |
| 6,539,107 B1 | 3/2003 | Michael et al. |
| 6,594,623 B1 | 7/2003 | Wang et al. |
| 6,624,899 B1 | 9/2003 | Clark |
| 6,639,624 B1 | 10/2003 | Bachelder et al. |
| 6,658,145 B1 | 12/2003 | Silver et al. |
| 6,681,151 B1 | 1/2004 | Weinzimmer et al. |
| 6,718,074 B1 | 4/2004 | Dutta-Choudhury et al. |
| 6,724,922 B1 | 4/2004 | Vilsmeier |
| 6,728,582 B1 | 4/2004 | Wallack |
| 6,748,104 B1 | 6/2004 | Bachelder et al. |
| 6,751,338 B1 | 6/2004 | Wallack |
| 6,751,361 B1 | 6/2004 | Wagman |
| 6,768,509 B1 | 7/2004 | Bradski et al. |
| 6,771,808 B1 | 8/2004 | Wallack |
| 6,798,925 B1 | 9/2004 | Wagman |
| 6,829,371 B1* | 12/2004 | Nichani ............... F16P 3/142  348/252 |
| 6,850,646 B1 | 2/2005 | Silver |
| 6,856,698 B1 | 2/2005 | Silver et al. |
| 6,903,177 B2 | 6/2005 | Seo et al. |
| 7,085,622 B2 | 8/2006 | Sadighi et al. |
| 7,212,228 B2 | 5/2007 | Utsumi et |
| 7,356,425 B2 | 4/2008 | Krahnstoever et al. |
| 7,360,410 B2 | 4/2008 | Steinbichler et al. |
| 7,373,270 B2 | 5/2008 | Ohashi et al. |
| 7,414,732 B2 | 8/2008 | Maidhof et al. |
| 7,609,893 B2 | 10/2009 | Luo et al. |
| 7,680,323 B1 | 3/2010 | Nichani |
| 7,777,300 B2 | 8/2010 | Tews et al. |
| 8,126,260 B2 | 2/2012 | Michael et al. |
| 2002/0113756 A1* | 8/2002 | Tuceryan et al. ............. 345/8 |
| 2004/0164858 A1* | 8/2004 | Lin ............................. 340/522 |
| 2004/0234118 A1 | 11/2004 | Astrom et al. |
| 2005/0089214 A1 | 4/2005 | Rubbert et al. |
| 2007/0075997 A1* | 4/2007 | Rohaly ............... G06T 7/593  345/419 |
| 2007/0081714 A1* | 4/2007 | Wallack ............... G06K 9/209  382/152 |
| 2007/0127774 A1 | 6/2007 | Zhang et al. |
| 2007/0273795 A1* | 11/2007 | Jaynes et al. ............. 348/745 |
| 2010/0166294 A1 | 7/2010 | Marrion |

FOREIGN PATENT DOCUMENTS

| | | |
|---|---|---|
| FR | 2598019 | 10/1987 |
| JP | 8-201021 | 8/1996 |
| JP | 2004-504077 | 2/2004 |
| JP | 2004-239747 | 8/2004 |
| JP | 2005-534026 | 11/2005 |
| WO | WO-9511491 | 4/1995 |

OTHER PUBLICATIONS

Zhang, Zhengyou, "A Flexible New Technique for Camera Calibration", Dec. 2, 1998, pp. 2-21, Publisher: Microsoft Research, Published in: Redmond, Washington/USA.

Stein et al, "Monitoring Activities from Multiple Video Streams Establishing a Common Coordinate Frame", Apr. 1999, pp. 1-23, Publisher: Massachusetts Institute of Technology, Published in: Massachusetts.

Tsai, Roger Y., "A Versatile Camera Calibration Technique for High Accuracy 3D Machine Vision Metrology Using Off the Shelf TV Cameras", 1987, pp. 323-344, Publisher: IEEE, Published in: Yorktown Heights.

Lavalee, Stephane et al., "Recovering the Position and Orientation of Free-Form Objects from Image Contours Using 3D Distance Maps," IEEE Transactions on Pattern Analysis and Machine Intelligence, vol. 17, No. 4, pp. 378-382, Apr. 1995.

Lepetit, "Point Matching as a Classification Problem for Fast and Robust Object Pose Estimation", Proceedings of the 2004 IEEE Computer Society Conference on Computer Vision and Pattern Recognition, p. 1-7, Jul. 2004.

Wunsch, P. et al., "Real-Time Pose Estimation of 3-D Objects from Camera Images Using Neural Networks", Proceedings of the 1997 IEEE International Conference on Robotics and Automation, pp. 3232-3237, Apr. 1997.

Wunsch, P. et al., "Registration of CAD-Models to Images by Iterative Inverse Perspective Matching", Proceedings of the 1996 International Conference on Pattern Recognition, pp. 78-83, 1996.

* cited by examiner

SYSTEM AND METHOD FOR VALIDATING CAMERA CALIBRATION IN A VISION SYSTEM

FIELD OF THE INVENTION

This invention relates to vision systems and more particularly to calibration of vision system cameras.

BACKGROUND OF THE INVENTION

Machine vision systems are commonly employed in industry to determine the alignment of parts and objects with respect to a predetermined two-dimensional (2D) or three-dimensional (3D) coordinate space. These systems employ various techniques and programs to determine alignment of objects, often based on trained models of the objects. Camera calibration is an essential step in computer vision—both in two-dimensional (2D) and three-dimensional (3D) imaging systems. Camera calibration involves modeling a camera's position and lens characteristics usually by estimating the intrinsic and extrinsic parameters. Camera calibration can be performed on either a single camera or a multi-camera arrangement, such as a system that includes one or more stereo camera heads. Stereo camera heads, and other forms of 3D sensors, enable the generation of a 3D depth image of an object. The calibration of these cameras determines the relationship between the observed 2D image spaces and the 3D world. After camera calibration, the 3D information can be inferred from 2D computer image coordinates, and likewise, the 2D image coordinates can be inferred from 3D information.

More particularly, camera calibration involves modeling an image formation system by estimating internal geometric and optical camera characteristics (intrinsic parameters, which can include effective focal length, or image plane to projective center distance, lens distortion coefficient, scale factor for x, due to camera scanning and acquisition timing error, computer image coordinate for the origin in the image plane) and the 3D position and orientation of the camera relative to a defined world coordinate system (extrinsic parameters). The camera intrinsics and extrinsics (which are often referred to as camera calibration parameters) are used in runtime alignment or inspection tasks to remove the lens distortion and interpret the observed 2D image feature points in a 3D space. The accuracy of camera calibration directly affects the performance of a vision system.

The use of one or more 2D or 3D cameras at one or more respective vantage points around a scene containing an object can provide advantages in generating an overall image of the subject object with respect to a world coordinate space. By combining the images of different cameras, various occlusions and obstructions of parts of the object which may occur in one or more images are compensated by images acquired from other vantage points. Thus, in all cases, but particularly where a vision system may employ a plurality of 2D or 3D cameras, the accuracy of camera calibration is crucial to the overall performance of the vision system. However, camera calibration is typically considered to be a one-time vision system setup procedure. It is usually performed by technicians with significantly more knowledge of the vision system than the typical runtime users—who are often manufacturing line workers and their supervisors. Typically, after the system is calibrated, the camera parameters are used repeatedly by machine vision tasks by these runtime users without regard to the true accuracy of the current calibration, as the only reliable way to confirm calibration is to perform all or part of the calibration procedure again.

Unfortunately, when the vision system operates in adverse environment, such as a manufacturing line, the actual camera position and lens distortions may change due to thermal expansion, vibration, inadvertent focus change, etc. Consequently, a machine vision application may perform suboptimally if the camera calibration no longer represents the relationship between observed 2D images and the 3D world. Furthermore, even if a machine vision application is performing suboptimally, it may be difficult to trace the root cause of the application's deteriorating performance due to camera miscalibration.

Thus, it is desirable to provide a runtime end user a straightforward and reliable technique to confirm that the initial camera calibration is still valid. If not, such users should be clearly informed that partial or full recalibration of the cameras in the system is needed. Desirably, the user should receive information from the system as to where the inaccuracy resides and identify the needed recalibration functions. Moreover, the steps required to confirm calibration should be capable of performance by a typical runtime end user with minimal training at any convenient time, and without the use of complex additional calibration equipment.

SUMMARY OF THE INVENTION

This invention overcomes disadvantages of the prior art by providing a relatively fast and straightforward system and method in which to validate the accuracy of camera calibration in a single or multiple camera embodiment, utilizing either 2D cameras or 3D imaging sensors. This system and method allows the runtime user to validate camera calibration at any convenient time by imaging a calibration object within the volume space of the camera arrangement. The resulting validation indicates if recalibration is required and can indicate which camera(s) requires recalibration. In an illustrative embodiment the system and method employs an initial calibration process that generates and stores intrinsic parameters and calibration result statistics (including calibration discrepancies between extracted and expected feature positions) based upon images of a first calibration object having a known pattern and dimensions acquired for at least one position within the volume space. A subsequent validation process (a) acquires images of the first calibration object or a second calibration object having a known pattern and dimensions; (b) extracts features of the images of the first calibration object or the second calibration object; (c) predicts positions expected of features of the first calibration object or the second calibration object using known positions of features of the first calibration object or the second calibration object based upon a solved pose of the first calibration object or the second calibration object and based upon the intrinsic parameters; and (d) computes a set of discrepancies between positions of the extracted features and the predicted positions expected of the features. The validation process then uses the computed set of discrepancies in a decision process that determines whether at least one of the discrepancies exceeds a predetermined threshold value in view of a difference with respect to corresponding discrepancies computed during calibration. If a value exceeds the threshold, then the system indicates a recalibration requirement and can identify the camera(s) that require recalibration, allowing efforts to be focused on those units and reducing recalibration time and overhead. The thresholds can be based on statistics stored during calibration. Where a multiple camera embodiment is provided, the calibration process can generate and store extrinsics as well, which are then used in the validation process along with the intrinsics by various steps of the process to generate discrepancies.

In an alternate embodiment, validation can include generation and storage of image rectification data for each of the cameras. Should rectification data differ from stored data by more than a predetermined threshold during validation, then the system indicates the need for recalibration.

In another alternate embodiment, the system and method performs an original calibration, retaining intrinsics and (in a multi-camera arrangement) extrinsics. The system also retains and stores feature correspondences with respect to the calibration object imaged in a plurality of positions. During validation, the same or a substantially similar calibration object is imaged at another position. The feature correspondences are extracted and generated. The combination of original correspondences and new feature correspondences are all employed to generate a new set of intrinsics (and extrinsics) for the cameras in the system. Discrepancies between the new and old calibrations are computed and these are compared against acceptance threshold values. If discrepancies exceed threshold values then the requirement for a recalibration is indicated.

According to another alternate embodiment, the validation process uses one or more validation images of a calibration object located at a known and repeatable position which can be compared to previous calibration images and statistics (including calibration discrepancies) to compute validation discrepancies. The validation process computes validation discrepancies by comparing image positions of predetermined features of the calibration object in the calibration image to image positions of the predetermined features of the calibration object in the validation image. The validation discrepancies are then compared to the calibration discrepancies to determine whether one or more of the compared discrepancies exceeds or deviates from the acceptance threshold. Based upon this comparison, the calibration either remains acceptable, or recalibration is required. In this embodiment, the calibration object can be a discrete calibration device (e.g. a plate located removably or fixedly within the scene) and/or environmental features within the scene, such as fixture brackets, fasteners, and the like. The fixed calibration object can be located so that it is either always visible, or visible at least when the runtime object being analyzed by the machine vision operation is absent. In general, where a calibration object is fixedly provided in a scene, the validation process can occur in an ongoing manner at predetermined time/event intervals, free of additional operator involvement.

BRIEF DESCRIPTION OF THE DRAWINGS

The invention description below refers to the accompanying drawings, of which.

DETAILED DESCRIPTION

A. System Overview and Calibration

Figure 1:
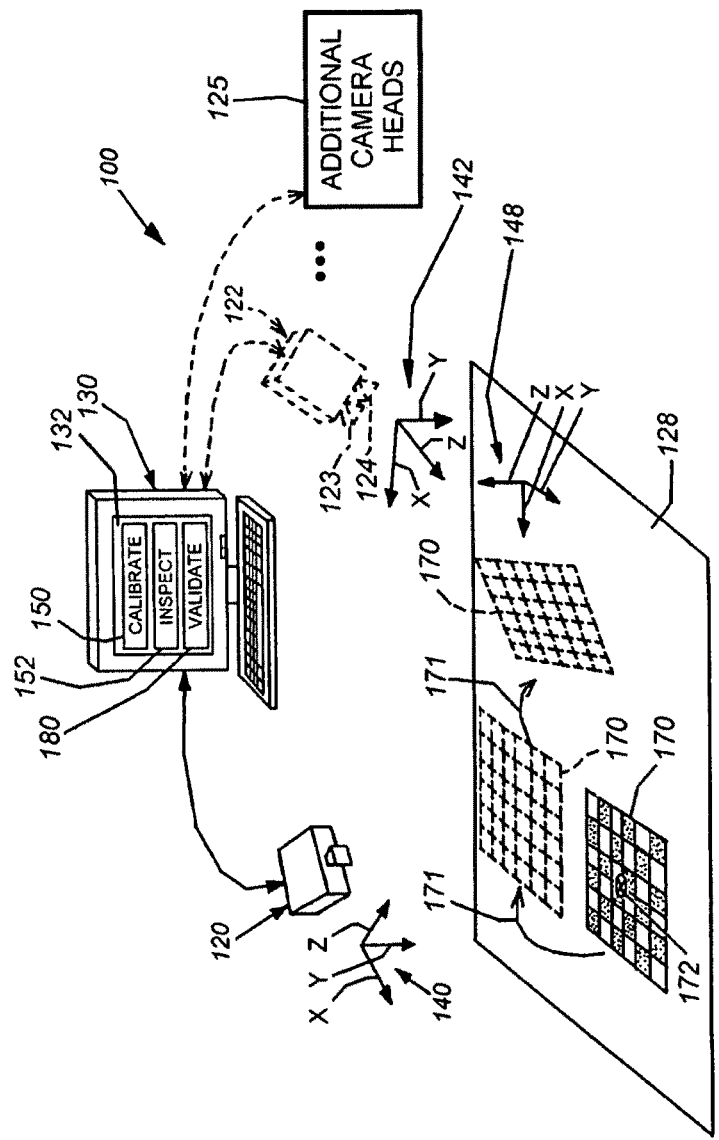
FIG. 1 is a diagram of a vision system employing a plurality of exemplary stereo camera heads undergoing a calibration process according to an embodiment of this invention.

FIG. 1 depicts a typical arrangement for a vision system 100 for determining the two-dimensional (2D) or three-dimensional (3D) alignment, or pose, of a viewed scene that can include one or more runtime objects to be inspected, aligned, acted upon by a robot manipulator, or any other operation that is controlled or assisted by machine vision processes. The system can be calibrated and validated according to an illustrative embodiment of this invention.

In general, the system 100 can be any vision system arrangement containing at least one camera having the object-containing scene 128 within its field of view. The camera or sensor can comprise a 2D camera 120 as shown, or optionally, a 3D camera 122 (shown in dashed-line phantom). The 3D camera in this example is a stereo camera head that generates depth images of a scene using optical triangulation between two discrete cameras 123, 124 within a stereo camera head (122), separated by a known baseline therebetween. Where 3D sensors are employed in the system 100, they can generate depth data using a variety of techniques a variety of techniques including, but not limited to stereo (multiple camera) imaging, Light Detection and Ranging or LIDAR, structured light, or devices that employ a scanning laser. Likewise, 2D and 3D imaging devices can operate according to a variety of principles including CCD and CMOS. For either 2D cameras or 3D sensors, a plurality of additional cameras/sensors, shown generically as block 125 can be located at different, discrete vantage points with respect to the scene 128. Where a plurality of stereo camera heads are provided, individual cameras within each head can be accessed separately by the system or the depth image generated by the head is provided as a raw data feed to a processor. This processor, to which the 2D camera(s) and/or 3D sensors is connected is shown, by way of example, as a general purpose computer 130 with interface and display that implements a software and/or hardware-based calibration process (150), and can also implement runtime vision processes (inspection, alignment, manipulation, etc.) (152). The arrangement, type and location of the vision processor(s) are highly variable. In illustrative embodiments, the processor(s) can be contained within the one or more 2D cameras and/or 3D sensors and appropriate wired or wireless interconnections between multiple cameras and/or sensors can be provided.

In embodiments in which multiple 2D cameras and/or multiple 3D sensors are employed, each camera 120, 122, 125 defines its own internal coordinate system, herein depicted as orthogonal x, y and z axes 140, 142, in which z is the camera optical axis directed toward the scene and x and y define the image plane. The vision processor (130) is adapted to calibrate each of these individual cameras' coordinate system to a common 3D world coordinate system 148, represented by the x, y and z axes with respect to the scene 128. A general discussion of 3D imaging and related concepts is found, by way of further background, in commonly assigned, U.S. patent application Ser. No. 12/345,130, entitled SYSTEM AND METHOD FOR THREE-DIMENSIONAL ALIGNMENT OF OBJECTS USING MACHINE VISION, by Cyril C. Marrion, et al., the teachings of which are incorporated herein by reference.

As shown further in FIG. 1, an exemplary camera calibration procedure, such as (but not limited to) calibration software available in connection with vision systems commercially available from Cognex Corporation of Natick, Mass. employs a flexible technique that typically requires the camera to observe a planar calibration object 170, having known size and shape, presented to the camera(s) 120, 122 and 125 at a plurality of different orientations (shown by way of example in phantom). This calibration procedure serves to adjust for each camera's intrinsics, and extrinsics (typically in a multiple camera embodiment), for defining the 3D world coordinate space for each camera. During the depicted calibration process, the technician or a robot moves (arrows 171) the calibration object 170—herein an illustrative checkerboard of known size and shape, which can also include a central fiducial 172—between each of the plurality of positions, while the calibration application 150 operates on the vision processing system 130 to acquire and analyze images of the object 170 at each position. Using the acquired images of the object, the camera calibration process estimates intrinsics and extrinsics from (image versus physical) feature correspondences relating observed 2D image feature points and 3D features that are located on a planar surface. In one example, these (image vs. physical) feature correspondences can be automatically determined by running, for example, the checkerboard feature extractor vision system software tool on images of a checkerboard calibration plate, both the software tool and the calibration plate are available from Cognex Corporation.

A well-known technique for camera calibration that can be applied to illustrative systems is described by Roger Tsai in *A Versatile Camera Calibration Technique for High-Accuracy 3D Machine Vision Metrology Using Off-the-shelf TV Cameras and Lenses*, IEEE JOURNAL OF ROBOTICS AND AUTOMATION, Vol. RA-3, No. 4, August 1987, pp. 323-344, the teachings of which are incorporated herein by reference as useful background information.

Figure 1A:
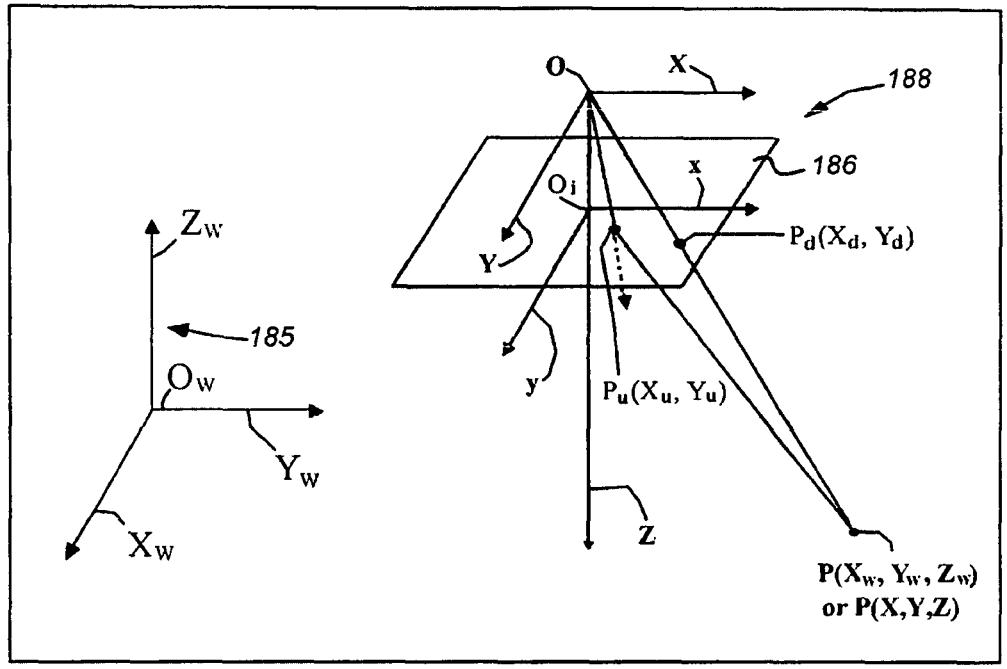
FIG. 1A is a graphical representation of the mapping points between a 3D world coordinate space and a 2D camera coordinate space, for use in embodiments herein.

By way of further illustration, and as provided in the Tsai publication, FIG. 1A illustrates the basic geometry of the camera model. $(X_w, Y_w, Z_w)$, defining the 3D coordinates of the object point P in the 3D world coordinate system. (X,Y,Z) define the 3D coordinates 185 of the object point P in the 3D camera coordinate system 188, which is centered at point O, the optical center, with the z axis the same as the optical axis (see also FIG. 1). (x,y) is the image coordinate system centered at $O_i$ (intersection of the optical axis z and the front image plane 186) and parallel to x and y axes. f is the distance between front image plane 186 and the optical center O. $(x_u, y_u)$ is the image coordinate of (X,Y,Z) if a perfect pinhole camera model is used. $(x_d, y_d)$ is the actual image coordinate which differs from $(x_u, y_u)$ due to lens distortion. However, since the unit for $(x_f, y_f)$ (the coordinates used in the processor) is the number of pixels for the discrete image in the processor's image frame memory, additional parameters should be specified (and calibrated) that relate the image coordinate in the front image plane to the processor's image coordinate system.

The mapping from the 3D world coordinates to the 2D camera coordinates system is illustratively provided as a four step transformation, which proceeds according to the following steps:

1. Perform rigid body transformation from the object 3D world coordinate system $(X_w, Y_w, Z_w)$ 185 to the camera 3D coordinate system (X,Y,Z)

$$\begin{bmatrix} X \\ Y \\ Z \end{bmatrix} = R \begin{bmatrix} X_w \\ Y_w \\ Z_w \end{bmatrix} + T$$

Where R is a 3×3 rotation matrix and T is the 3×1 translation vector. The parameters to be calibrated are R and T.

2. Perform transformation from 3D camera coordinates (X,Y,Z) to ideal (undistorted) image coordinates $(x_u, y_u)$ using perspective projection with pinhole camera geometry $$x_u = f \frac{X}{Z}$$
$$y_u = f \frac{Y}{Z}$$

The parameter to be calibrated is the effective focal length f.

3. Calculate radial lens distortion as $$x_d + D_x = x_u$$
$$y_d + D_y = y_u$$

Where $(x_d, y_d)$ is the distorted or true image coordinate on the image plane 186. There are a number of models available for specifying radial lens distortion. For one of the models, $$D_x = x_d(\kappa_1 r^2 + \kappa_2 r^4 + \dots)$$
$$D_y = y_d(\kappa_1 r^2 + \kappa_2 r^4 + \dots)$$
$$r = \sqrt{x_d^2 + y_d^2}$$

The type of model to be used can be decided based upon the type of lens that is used for imaging. The parameters to be calibrated in the above model are the distortion coefficients $\kappa_i$.

4. Perform true image coordinate $(x_d, y_d)$ to processor image coordinate $(x_f, y_f)$ transformation $$x_f = a_x d'^{-1}_x x_d + C_x$$
$$y_f = d_y^{-1} y_d + C_y$$

Where
$(x_f, y_f)$ Row and column numbers of the image pixel in processor image frame memory
$(C_x, C_y)$ Computer image coordinate for the origin in the image plane $$d'_x = d_x \frac{N_{cx}}{N_{fx}}$$

$d_x$ Center to center distance between adjacent sensor elements in x (scan line) direction $d_y$ Center to center distance between adjacent CCD sensor in the y direction $N_{cx}$ Number of sensor elements in the x direction $N_{fx}$ Number of pixels in a line as sampled by the processor $a_x$ is due to a variety of factors, such as slight hardware timing mismatch between image acquisition/processor hardware and camera scanning hardware, or the imprecision of the timing of scanning itself. Setting $s_x = a_x d'^{-1}_x$, and setting $d_y$ to one, we need to find $s_x$. When $d_y$ is set to one, the computed focal length f will be a product of the actual focal length and the scale factor in y.

Figure 1B:
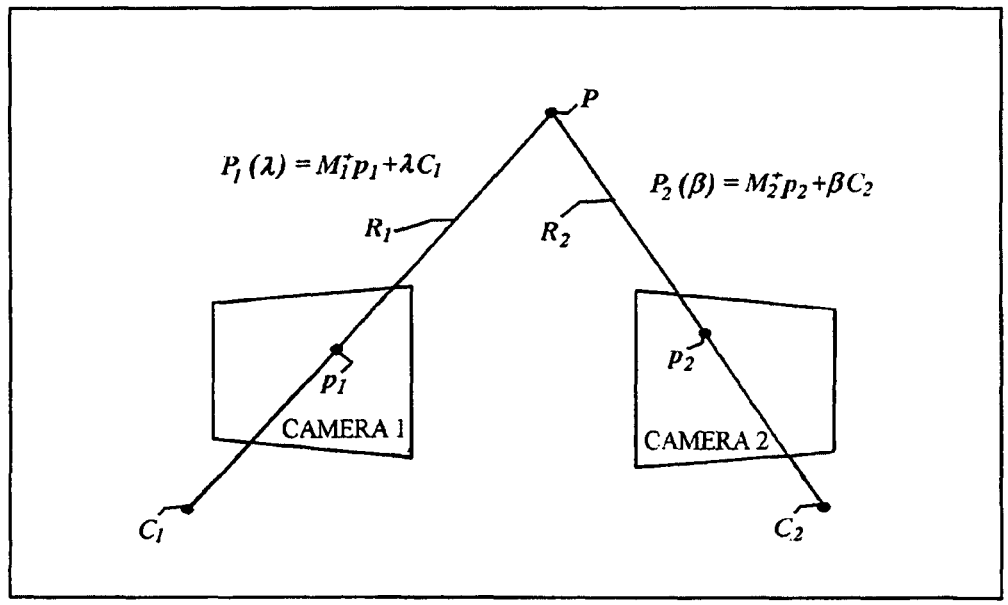
FIG. 1B is a graphical representation of triangulation of a point in a world coordinate system from its image points in two or more cameras for use in embodiments herein.

Following the mapping, the calibration process can perform triangulation. The following description of calibration is further discussed, by way of background in the book *Multiple View Geometry*, Second Ed., by Richard I. Hartley and Andrew Zisserman, Cambridge University Press, 2004. To simplify the present description, it is now assumed that the radial distortion is negligible. Thus, the mapping from a point in the 3D world coordinate system 185 to processor image coordinate system 188 is governed by the camera calibration matrix M. For a system with n cameras these matrices can be denoted as $M_i$, $1 \le i \le n$. Referring to FIG. 1B, a point P in the world is mapped as $p_i$ according to the equation $p_i = M_i P$. Similarly given the image of a point (exemplary points $p_1$ and $p_2$ as shown) in two or more cameras (exemplary CAMERA1 and CAMERA2 as shown), its position in the world coordinate system can be computed using triangulation. For a point $p_i$ ($p_1, p_2$) in respective camera i (CAMERA1, CAMERA2) the image projects as a ray $R_i$ ($R_1$ and $R_2$). The equation of the ray in the world coordinate system is given by $P_i(\lambda) = M_i^+ p_i + \lambda C_i$, where $C_i$ ($C_1$ and $C_2$) is the center of the camera in the world coordinate system. $C_i$ and $M_i^+$ are obtained from the camera calibration parameters. The point in the world coordinate system can be obtained by finding the point of intersection between the rays from the multiple cameras.

In practice, when noise is present, the two rays ($R_1$ and $R_2$) are not guaranteed to intersect. There are several techniques available to triangulate in such situations. The illustrative embodiment employs a technique that first finds a point in world coordinate system that has the least sum of distance between the point and all the rays. This estimate is refined based upon the distance of the point from the centers of the camera and the angle of the rays to the optical axis. Other techniques for triangulation can also be employed in addition to, or in substitution for, this technique.

Thus, referring further to FIG. 1B, the value for point P is derived using triangulation as described herein, and the location P is computed by finding the values of $\lambda$ and $\beta$ in the equations $P_1(\lambda) = M_i^+ p_i + \lambda C_i$ and $P_2(\beta) = M_2^+ p_2 + \beta C_2$.

A variety of alternate calibration mathematical models and calibration processes can be employed in accordance with embodiments of this invention. For example, additional refinements to the calibration process are taught by Zhengyou Zhang in *A Flexible New Technique for Camera Calibration*, Technical Report MSR-TR-98-71, Microsoft Research, Dec. 2, 1998 (last updated Aug. 13, 2008), the teachings of which are incorporated by reference as useful background information. Illustratively, the camera calibration process involves a non-linear optimization method to minimize the discrepancy between detected 2D image feature points (e.g. the corners of checkerboard squares) and the feature points predicted based on the camera calibration (both intrinsic and extrinsic parameters). The camera calibration process computes the calibration plate poses (with respect to the camera).

B. General Validation Principles and Comparison of Discrepancies

As discussed above, the calibration process is generally performed infrequently and by skilled technicians. Deviation from a correct calibration based on changes in camera intrinsics and/or extrinsics may be difficult to detect. Accordingly, the illustrative embodiment provides a straightforward process for validating the accuracy of the present calibration of one or more 2D cameras or 3D sensors that can occur at any convenient time and can use as few as one image of the calibration object at any convenient positioning within the field of view of the camera(s). Before discussing the steps of the validation process in detail, some general principles in computing and comparing "discrepancies" or "residuals" between calibration images and validation images that are used in association with the process according to various techniques is now described.

1. Validation Using 3D and Image Discrepancies

The accuracy of the calibration for a system with two or more cameras can be validated by acquiring a single image of the calibration object, that is substantially similar to the calibration object or plate 170 used for calibration as described above. The features of the calibration object are extracted from each image by the processor in a validation mode of the system. An embodiment of validation process employs a checkerboard calibration plate (e.g. plate 170), and extracts the features using the above-described checkerboard feature extractor vision system software tool, both available from Cognex Corporation. Different vision tools capable of extracting desired features can be used in alternate embodiments. Once the features are extracted, the correspondence between the features is established. In the case of the illustrative checkerboard calibration object/plate, a fiducial (172) on the plate helps identify correspondence between features in the two images. Using the triangulation procedure described in a previous section the positions of these features in the 3D world coordinate system are computed. Given n corresponding points in all the images, after triangulation, there will be n points computed in the world coordinate system, denoted by $X_i^{extracted}$, $1 \le i \le n$. The calibration object has known shape, and feature locations, and has its own coordinate system. Therefore it is possible to align its coordinate system to the 3D world coordinate system and to compute the position of the features in this pose. Only feature positions corresponding to $X_i^{extracted}$ are considered. These points will be referred to as $X_i^{expected\ in\ world}$. A three-dimensional rigid transform T that minimizes the sum of square distance between $X_i^{extracted}$ and the mapping $X_i^{expected} = T X_i^{expected\ in\ world}$ for all n points is computed. The discrepancy in the 3D position between $X_i^{extracted}$ and $X_i^{expected}$ given by $$\sqrt{\sum_{i=1}^{n} \frac{(X_i^{expected} - X_i^{extracted})^2}{n}}$$

is computed. This value is compared to the discrepancy obtained from the images used to calibrate the system, and if it is above a certain acceptance threshold, then the user is asked to repeat the calibration. In addition, $X_i^{expected}$ is projected onto the image plane for each camera using their respective calibration information. The points are defined herein as $X_i^{expected}$. Only features computed by the feature detector that corresponding to the points in $X_i^{extracted}$ are considered. These points are defined herein as $x_i^{extracted}$. The discrepancy in the 2D position between $x_i^{extracted}$ and $x_i^{expected}$ given by $$\sqrt{\sum_{i=1}^{n} \frac{(x_i^{expected} - x_i^{extracted})^2}{n}}$$

is computed. This value is compared to the discrepancy obtained for the images used to calibrate the system and if it is above a certain threshold, the user is asked to repeat the calibration. This process is accomplished for all cameras in the system.

2. Validation Using Triangulation Discrepancies

The accuracy of the calibration of an embodiment with two or more cameras with a common viewing area can be validated by acquiring a single image of the calibration object that is substantially similar to the one used for calibration (e.g. calibration object 170). The features of the calibration object are extracted from each image, using in an embodiment the above-described checkerboard feature extractor vision system software tool. Once the features are extracted, the correspondence between the features is established. In the case of the checkerboard calibration plate, a fiducial on the plate helps identify correspondence between features in the two images. Using the triangulation procedure described above (referencing FIG. 1B), the positions of these features in the 3D world coordinate system are computed. Given n corresponding points all the images, after triangulation, there will be n points computed in the world coordinate system, denoted by $X_i^{extracted}$, 1≤i≤n. Ideally, if the cameras are perfectly calibrated, in the absence of noise the rays obtained during triangulation would intersect at one point (see FIG. 1B). However, in practice the rays are not guaranteed to intersect. The triangulation discrepancy or residual is computed as the sum of shortest distance between the triangulated point P and the ray ($R_1$ and $R_2$) from each camera that was used to compute the triangulated point. In this embodiment, the root mean square (RMS) value of this parameter for all the feature points is computed using the images acquired during validation. This value is compared to the value obtained for the calibration images. If it is above a certain acceptance threshold, then the user is asked to repeat the calibration.

Figure 1C:
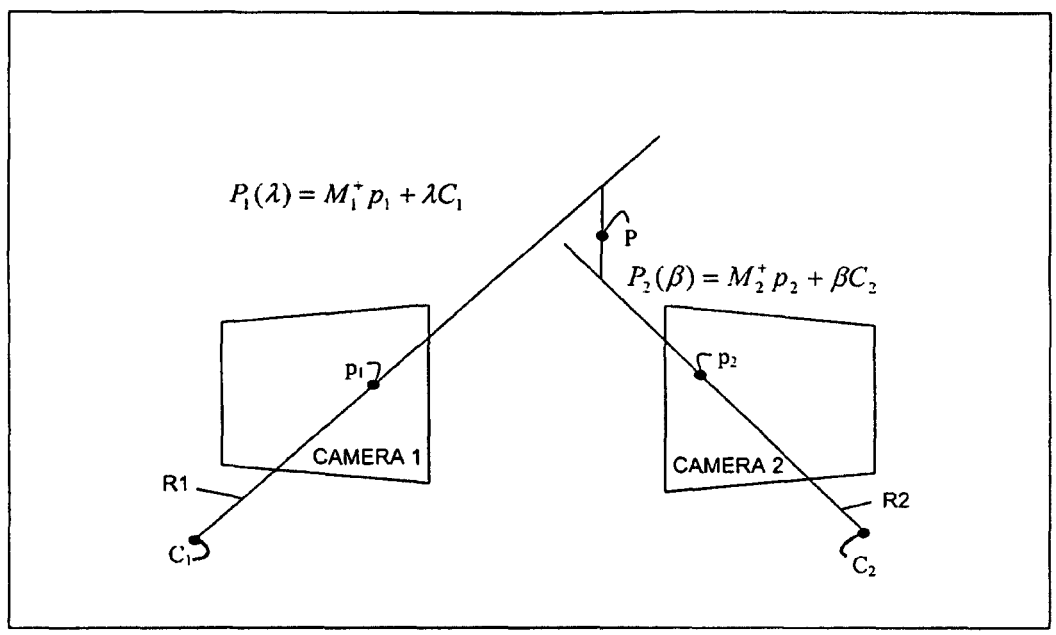
FIG. 1C is a graphical representation of triangulation of image points in accordance with FIG. 1B where uncertainty in image positions exists.

As discussed above during both calibration and validation there may be uncertainty in the position of point P. FIG. 1C illustrates an illustrative the technique for computing the position of a point P in the world coordinate system, using triangulation, when there is an uncertainty in the position of its image in the cameras. For a point $p_i$ in camera i the image back-projects as a ray $R_i$. The uncertainty in the image positions could result in the back-projected rays from the cameras not intersecting. There are several techniques available to triangulate in such situations. In an embodiment, the system employs a technique that first finds a point in 3D world coordinate system that has the least sum of distance between the point and all the rays ($R_1$ and $R_2$). The position of this point is refined based upon its distance from the centers of the camera and the angle of the rays to the optical axis. Differing techniques for triangulation can also be employed in alternate embodiments. In an illustrative embodiment, the triangulation discrepancy or residual for a feature is computed as the sum of shortest distances between its triangulated point obtained by refinement, and the ray from each camera that was used to compute the point.

3. Validation of One Camera

The accuracy of the calibration of an embodiment with a single camera can be validated by acquiring a single image of the calibration object that is substantially similar to the one used for calibration. The features of the calibration object are extracted from the image using procedures and vision tools as described generally above. Illustratively, each feature point extracted in the image is defined herein as $x_i^{extracted}$, 1≤i≤n. Once the features are extracted, the correspondence between the features and the calibration object is established. In the case of the checkerboard calibration plate (170), the fiducial (172) on the plate helps establish this correspondence. The calibration object has known shape, and feature locations, and has its own coordinate system. Therefore, it is possible to align its coordinate system to the world coordinate system and to compute the position of the features in this pose. Only feature positions corresponding to $x_i^{extracted}$ are considered. These points are herein referred to as $X_i^{expected\ in\ world}$. The pose of the calibration object is manipulated, and for each manipulation the mapping $X_i^{expected} = T X_i^{expected\ in\ world}$ for all n points is computed. $X_i^{expected}$ is projected onto the image plane using the camera's calibration information (calibration parameters). These points are defined herein as $x_i^{expected}$. The discrepancy in the 2D position between $x_i^{extracted}$ and $x_i^{expected}$ given by $$\sqrt{\sum_{i=1}^{n} \frac{(x_i^{expected} - x_i^{extracted})^2}{n}}$$

is computed. The pose is manipulated iteratively until the value of this parameter reaches a minimum value. This minima is compared to the discrepancy obtained for the images used to calibrate the system, and if it is above a certain acceptance threshold, then the user is asked to repeat the calibration.

C. Validation Process

Figure 2:
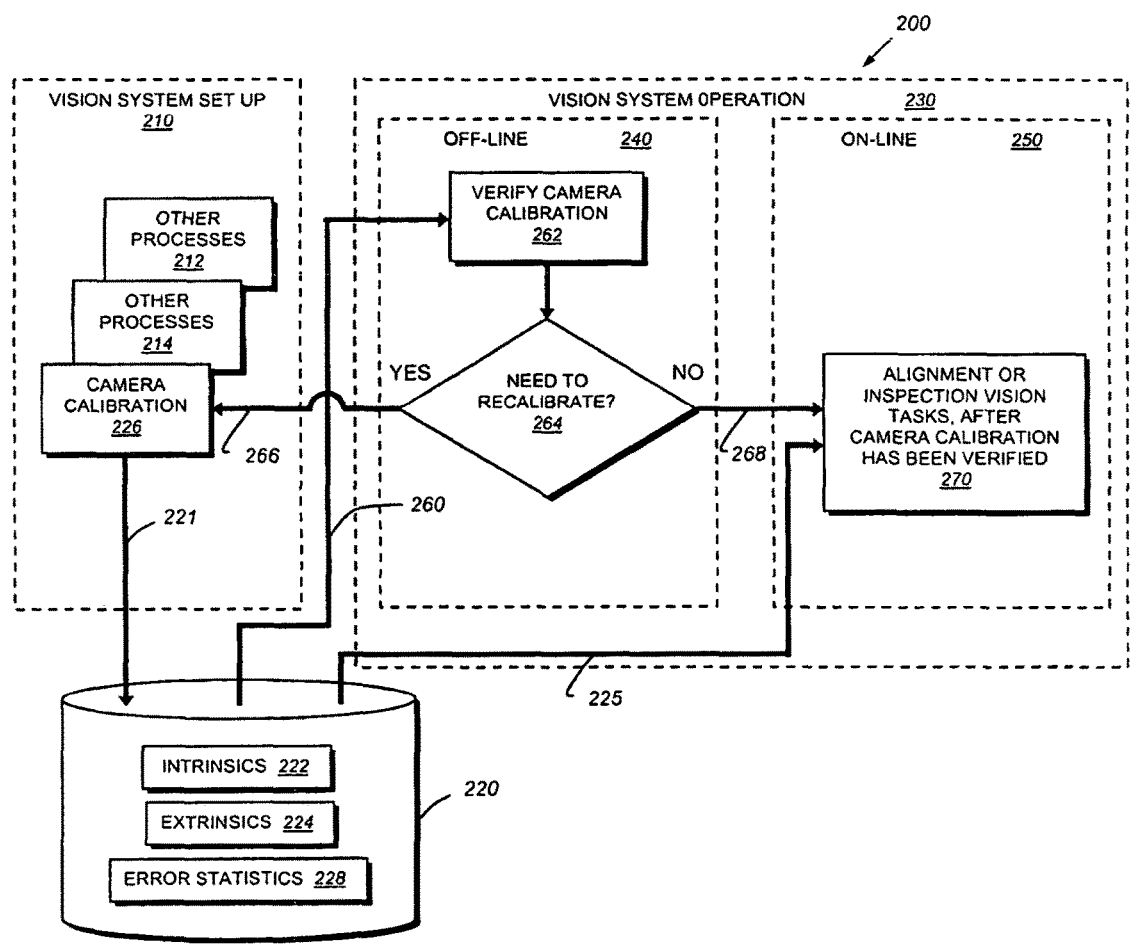
FIG. 2 is a block diagram of the setup and calibration process for a vision system and the runtime inspection and calibration validation process according to an illustrative embodiment.
Figure 3:
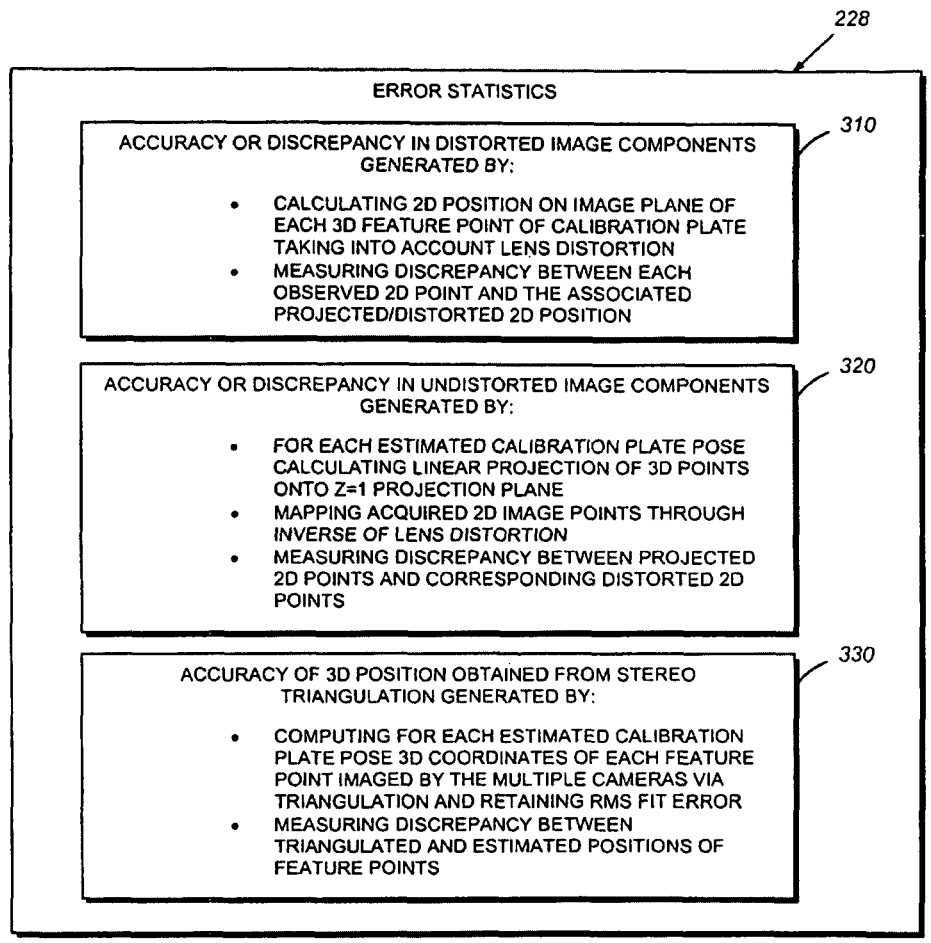
FIG. 3 is a diagram showing the various error statistics, subsets of which are used during the validation process of FIG. 2.

Thus, having described the general technique for deriving and comparing discrepancies between images in a single and multiple-camera embodiment, reference is now made to FIG. 2, which shows a schematic overview 200 of the system calibration process, runtime alignment or inspection tasks and offline validation of the accuracy of the present system calibration. As shown, as part of the setup processes 212, 214 of the machine vision system (block 210) its storage 220 is provided with (arrow 221) the camera intrinsics 222 and extrinsics 224 that are derived and used (arrow 225) after the camera calibration process 226 during system runtime operation (block 230). In the illustrative embodiment, the setup storage 220 also stores "error" statistics 228 containing information with respect to the discrepancies between the observed image features and predicted physical features that can be used to define accepted thresholds that allow the system to determine whether calibration is still within tolerances. With reference also to FIG. 3, these stored statistics 228 include, but are not limited to:

a. Accuracy or discrepancy in the distorted image coordinates (actual acquired pixels) 310. For each estimated calibration object/plate pose, the calibration process calculates the 2D position on the image plane of each 3D feature point (corners of checkers in the plate's pattern), taking into account lens distortion. The accuracy measurements correspond to the discrepancy between each observed 2D point and the associated projected/distorted 2D position, and are stored as error statistics 228;

b. Accuracy or discrepancy in the undistorted image coordinates (i.e. the z=1 projection plane in a 3D coordinate system in which z is the depth of each pixel and x, y are the 2D coordinates for each pixel within the field of view) 320. For each estimated calibration plate pose, the process calculates the linear projection of the 3D points onto the z=1 projection plane. In addition, the process maps the acquired 2D image points through the inverse of the lens distortion (in other words, points are recomputed using the stored lens correction factors). The accuracy measurements correspond to the discrepancy between the projected 2D points and the corresponding distorted 2D points and are stored as error statistics 228; and c. Accuracy of 3D position obtained from stereo triangulation 330. For a multiple camera system, for each estimated calibration plate pose, the process computes the 3D coordinates of each feature point imaged by multiple cameras via triangulation and retains the rms-FitError. The discrepancies between triangulated and estimated positions of feature points for the multiple cameras are stored as error statistics 228.

The above-described accuracy measurements a-c above are well-known to those of ordinary skill in vision systems and can be generated using procedures known to those of ordinary skill. These measurements are typically used to compare one camera calibration method with another. In accordance with an illustrative embodiment of this invention, these error statistics 228 are stored so that they can be used to subsequently validate the validity of the camera calibration during runtime operation (block 230 in FIG. 2). Note that the acceptance threshold can be variably set according to the particular vision system application requirements. That is, certain applications may dictate a higher degree of accuracy, requiring a lower acceptance threshold (e.g. a smaller difference between calibration and runtime/validation discrepancies).

The accuracy of camera calibration, described above, directly affects the performance of a vision system. While most vision systems consider camera calibration to be a one-time system set up task, the actual behavior of an image formation system may drift over time due to thermal expansion of camera frame, inadvertent movement of camera, etc. One way to address this drift is to periodically recalibrate the cameras. However, calibrating cameras is a demanding task that requires acquiring multiple images of a calibration target with various poses, and can be time consuming. Furthermore, it usually involves a skilled person, such as a system integrator. Consequently, camera calibration (block 214) is typically performed only when needed, and by skilled specialists.

According to an illustrative embodiment, a calibration validation process (block 240) is provided, which is typically performed by end users during runtime operation (block 230). The validation process is performed when the system is offline—that is, it is not presently engaged in an online alignment or inspection process on objects (block 250). In an illustrative embodiment of the validation process, the user operates the processor via an interface (for example, computer 130 in FIG. 1) to activate the validation application (180). The user also places a calibration target such as the calibration plate 170 in the working volume so that it resides within the system camera(s) field(s) of view. In general, it is desirable to employ the same plate (or at least the same-dimensioned and patterned plate) that is used during system setup (block 210) so that the system can directly correlate any statistics derived during setup against images of a calibration plate pattern that are assured of being the same in feature location, size, etc. Once the system is ready and the plate is positioned within the volume space, it acquires one, or multiple images, of the plate using the single, or multiple, cameras in the vision system. The validation process estimates the pose(s) of the calibration target assuming the camera calibration is still valid, and computes accuracy statistics based on the image(s), using the approaches described generally above. By comparing these statistics measurements to the error statistics measurements stored from the original camera calibration step (branch 260), the validation process (step 262) can determine whether the camera calibration is still valid (decision step 264). The interface (for example, processor/computer 130) informs the user as to whether accuracy is sufficiently degraded so that recalibration is required (branch 266). If no recalibration is needed, then the system can be returned to online operation (block 250 via branch 268) so that alignment, inspection, vision guided robotics or other online operations (block 270) can proceed with assurance of accuracy. In the illustrative embodiment, the validation process entails relative low system downtime and user overhead, as it involves acquiring a minimum of one image of one target at one position within the volume. Moreover, this approach employs lower computational overhead than a full calibration process, thereby saving time.

The comparison of calibration measurements versus validation measurements can be accomplished using a variety of techniques. One embodiment is to compare the accuracy observation in validation process and calibration process using Statistical Hypothesis Testing. That is, given a distribution of calibration measurements and a distribution of validation measurements, the statistical correlation of the two distributions. The Null Hypothesis can be set as the two procedures have the same accuracy with certain statistical significance. Once a decision is made based on the two sets of observations, the end user can determine if the cameras need to be recalibrated. Another embodiment is to compare the maximum discrepancy to a threshold set as a function of discrepancies observed at camera calibration time.

Figure 4:
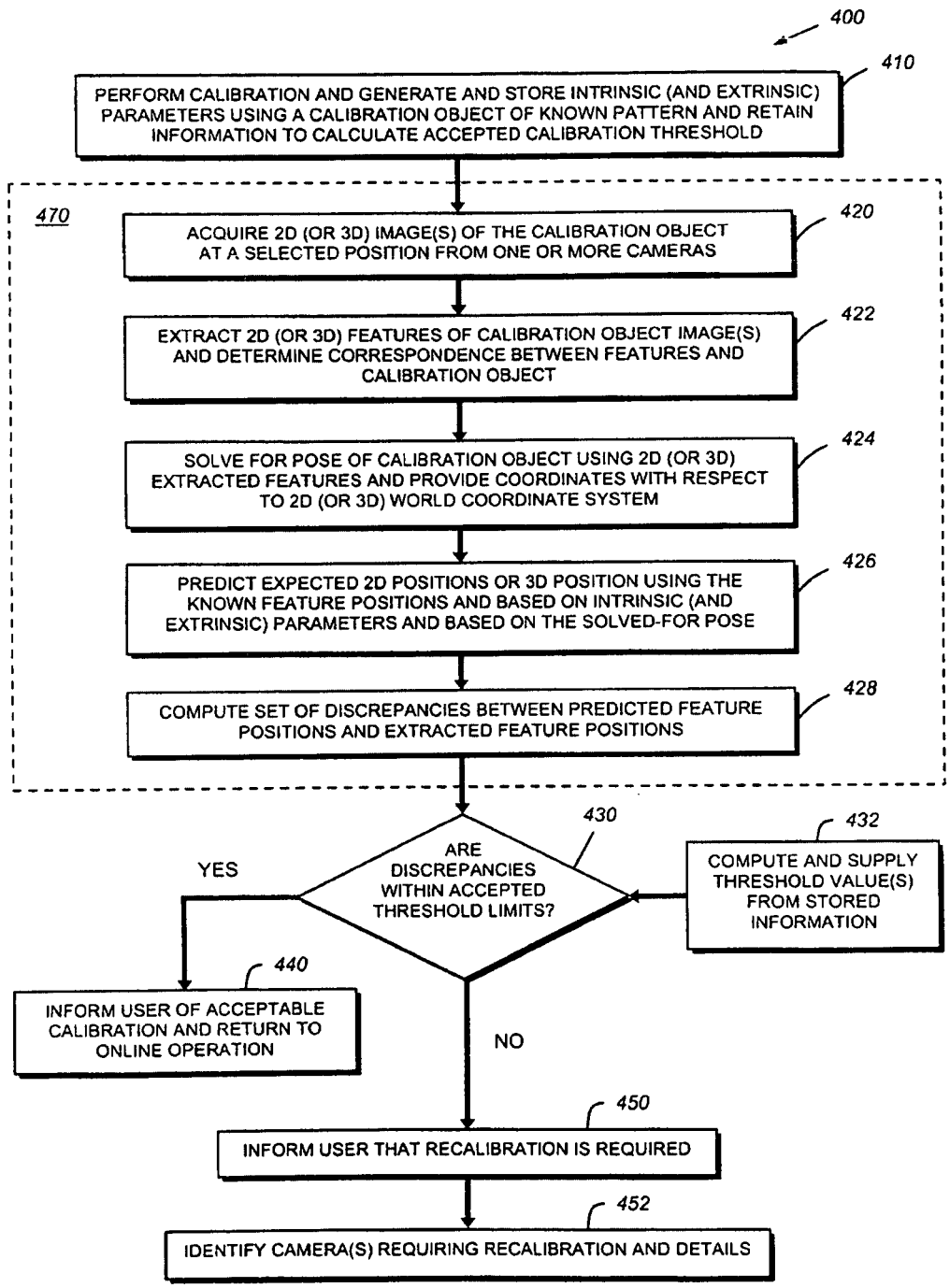
FIG. 4 is a flow diagram of the calibration validation process according to an illustrative embodiment.

Reference is now made to FIG. 4, which describes a general process 400 for validating camera calibration in either a single or multi-camera arrangement, and based upon either 2D or 3D imaging. Since the use of 3D imaging and/or multiple cameras is optional, and this approach can be applied to single 2D camera embodiments, the optional aspects thus appear in parentheses ( ) in the steps of the process 400. Note that for a single camera system, the validation process verifies typically only if the intrinsics of the camera has changed, as the ability to compare extrinsics between cameras can be unavailable. In alternate embodiments, appropriate sensors, etc. can be used to allow the detection of extrinsic changes. In the multiple camera embodiment, both the intrinsics and the extrinsics of the cameras in the system are verified and a camera-to-camera comparison of extrinsics can allow the particular camera(s) experience extrinsic change (as well as intrinsic change) to be readily identified so that corrective recalibration of the particular camera(s) can be implemented. The illustrative validation process 400 relies upon the initial calibration step 410 in which intrinsic and extrinsic parameters are generated based upon multiple poses of a calibration object (plate 170, for example) of known pattern, dimensions, etc. The intrinsic and extrinsic parameters form the basis of the error statistics as described above. In addition, information needed to derive a threshold value is retained and stored. This threshold information can be computed by a variety of statistical mechanisms and/or can be a user/factory supplied value. Such information is used in the validation steps described below to determine if the calibration is still within accepted values.

Once appropriate measurements have been stored during the setup and calibration step 410, these can be used subsequently during runtime operation during offline validation, which begins at step 420 with the placement of the same or another calibration object (e.g. plate 170) of known dimension, pattern, etc. at a desired position within the volume space of the system. In a straightforward implementation, the runtime user lays the calibration object on the stage or other object supporting surface and instructs the validation application to acquire, using one or more cameras (e.g. a single or multiple non-stereo head arrangement, a single two-camera stereo head or multiple stereo heads) to acquire one or more 2D (or 3D) images of the object in that position.

The application extracts 2D (or 3D) features of the object using, for example the above-described checkerboard feature tool (step 422). The features extracted are illustratively checkerboard edges that are identified as to their known discrete locations within the overall object by reference to a known indicia (172 in FIG. 1), or another usable reference point. The mechanisms by which edges are extracted as features can employ a variety of available vision tools. For example, tools that search for zero-crossing points and/or abrupt contrast changes can be employed. Next in step 424, the process 400 solves for the pose of the calibration object using the extracted 2D or 3D features. That is, the object is aligned with reference to the 2D (or 3D) world coordinate system (e.g. axes 164).

Next the process 400 predicts the expected 2D (or 3D) positions of calibration object features using the known feature positions within the object based upon the solved-for pose, and also correcting for the intrinsics (and extrinsics) stored for each camera (step 426). Then, the process 400 computes a set of discrepancy measurements also termed "residuals") by comparing the predicted feature positions against the extracted feature positions in step 428

Based upon the comparison of predicted and extracted features, the computed discrepancies are subjected to an analysis with respect to the acceptance threshold value(s) in decision step 430. The threshold information is provided from calibration step 410 described above. The thresholds can be computed with respect to associated features during the validation process 400 using a number of techniques. Some techniques involve percentage deviation of a given extracted feature from the corresponding predicted feature, or an absolute variation (e.g. a distance of a certain number of pixels) can be provided as the threshold for given features. The computed thresholds are input into the decision step 430 via the representative block 432. In an illustrative embodiment, the calibration step 410 (which itself includes an initial version of steps 420-428) allows the above-described discrepancy between initial predicted/expected and extracted positions for the calibration plate to be generated as part of the process of creating intrinsic (and extrinsic) correction parameters for the system. This discrepancy can be defined as the "rmsFitError" in illustrative embodiments. The associated discrepancies obtained at the initial calibration time can be used to calculate thresholds, by, for example applying a percentage deviation thereto in a discrepancy comparison process. As described above, a variety of approaches can be performed to compute the calibration and validation discrepancy sets (e.g. triangulation, single camera, 3D mapping, etc.) that are used in the subsequent comparison against acceptance threshold values.

If, after comparison, the discrepancies obtained at validation time remain within the acceptance thresholds with respect to those obtained at calibration, then the system indicates an acceptable calibration and the user can return the system to online inspection (or other) vision operations (step 440). Conversely, if one or more discrepancies (or a set of discrepancies) deviates outside the threshold limits, then the system indicates that recalibration is needed. The process application can also optionally prevent further online use and/or provide a continued warning that recalibration is needed. In addition, the process 400 can inform the user which camera or cameras require recalibration and what the specific nature of the inaccuracy is (step 452). In the case of a discrepancy related to intrinsic, the responsible technician can perform a more limited recalibration of that camera to correct only intrinsic issues. In the case of a multiple camera system having extrinsic discrepancies, the technician can perform recalibration on the specific identified camera to correct for any misalignments or other changed factors. In both cases, the ability to use the discrepancies to identify the particular problematic camera and perform recalibration on that particular camera greatly speeds any recalibration process.

One illustrative process for computing the validation discrepancy threshold is to use the 3-sigma deviation from the average discrepancies from all of the cameras from all of the views—in this case, the average discrepancies (averaged over all the features in each image) from all of the cameras from all of the calibration images are collected into a distribution from which the mean and standard deviation are computed. Then, the validation discrepancy threshold corresponds to that computed mean plus three times that computed standard deviation. Another illustrative process for computing the validation discrepancy threshold is to use the individual cameras' 3-sigma deviations. In this case, each camera's validation discrepancy threshold is separately computed from the average discrepancies (averaged over all the features in each image) from all the calibration images. Yet another illustrative process for computing the validation discrepancy threshold is to compute the maximum average discrepancy (averaged over all the features in each image) from all of the cameras from all of the calibration images. A further illustrative process for computing the validation discrepancy threshold is to compute individual validation discrepancy thresholds for each individual camera—for each camera, the average discrepancy (averaged over all the features in each image) is computed from all of the calibration images, and then the maximum such average discrepancy is used as the validation discrepancy threshold. Another illustrative process for computing the validation discrepancy threshold is to compute 125% of the maximum average discrepancy. Note that there is no requirement to use the average discrepancies when computing the validation discrepancy threshold. A further process for computing the validation discrepancy threshold is to use the 3-sigma from the individual discrepancies from all of the cameras from all of the views. In this case, we can compute a 3-sigma discrepancy and then "accept" a validation result if 90% of the computed discrepancies are less than the threshold discrepancy. Still another process for computing the validation discrepancy threshold is to use the 3-sigma from the individual discrepancies for each of the cameras separately. For each camera, the process collects the discrepancies over all of the views and computes a 3-sigma threshold—then the process will "accept" a validation result if 90% of the computed discrepancies are less than the threshold discrepancy.

Figure 5:
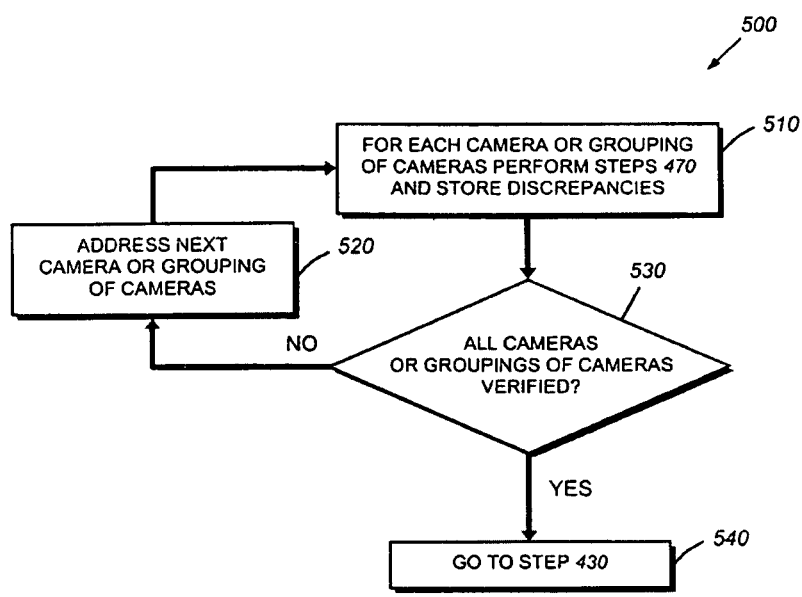
FIG. 5 is a flow diagram of the performance of the steps of the validation process of FIG. 4 on predetermined groupings or subsets of the overall set of cameras in sequence.

In an illustrative embodiment, the process 400 can be run first on the intrinsics of each discrete camera, determining whether any particular camera has become miscalibrated, then the process can be run on pairs (or other groupings/subsets) of cameras (if any) to determine is any pair/group provides an extrinsic discrepancy. As shown in FIG. 5, the overall process (500) can generally perform steps 420-428 (box 470) in FIG. 4 (step 510) on each grouping of cameras in a loop (step 510). For example, in a multiple stereo head arrangement as shown in FIG. 1, the process 500 can be performed on successive pairs or subsets of the overall set of cameras. For example given stereo heads 1 and 2 with respective cameras A, B and C, D, the process 500 is performed, in turn of A and B, then B and C, then C and D, and so on. Each next subset or grouping (step 520) is processed in accordance with step 510 until all subsets or groupings have been processed. The resulting computed discrepancies are delivered to step 430 (step 540 via decision step 530) to determine whether thresholds are exceeded. In an alternate embodiment, at least one (or all of) steps 430, 432, 440, 450 and 452 can be included in the process of step 510, and calibration accuracy can be determined and/or reported on groups as they are processed.

Note that in a 2D calibration and validation embodiment, lens distortion in an image of a calibration plate is addressed by rectification of the image (e.g. a warped 2D image of the plate is made linear). Such rectification (not shown) can be part of the extraction step 422. Where the 2D image is no longer accurately rectified (e.g. the discrepancies between extracted and predicted features are high) using the same rectification parameters as stored during setup, this can indicate an inaccurate calibration, requiring recalibration of the affected camera(s).

Figure 6:
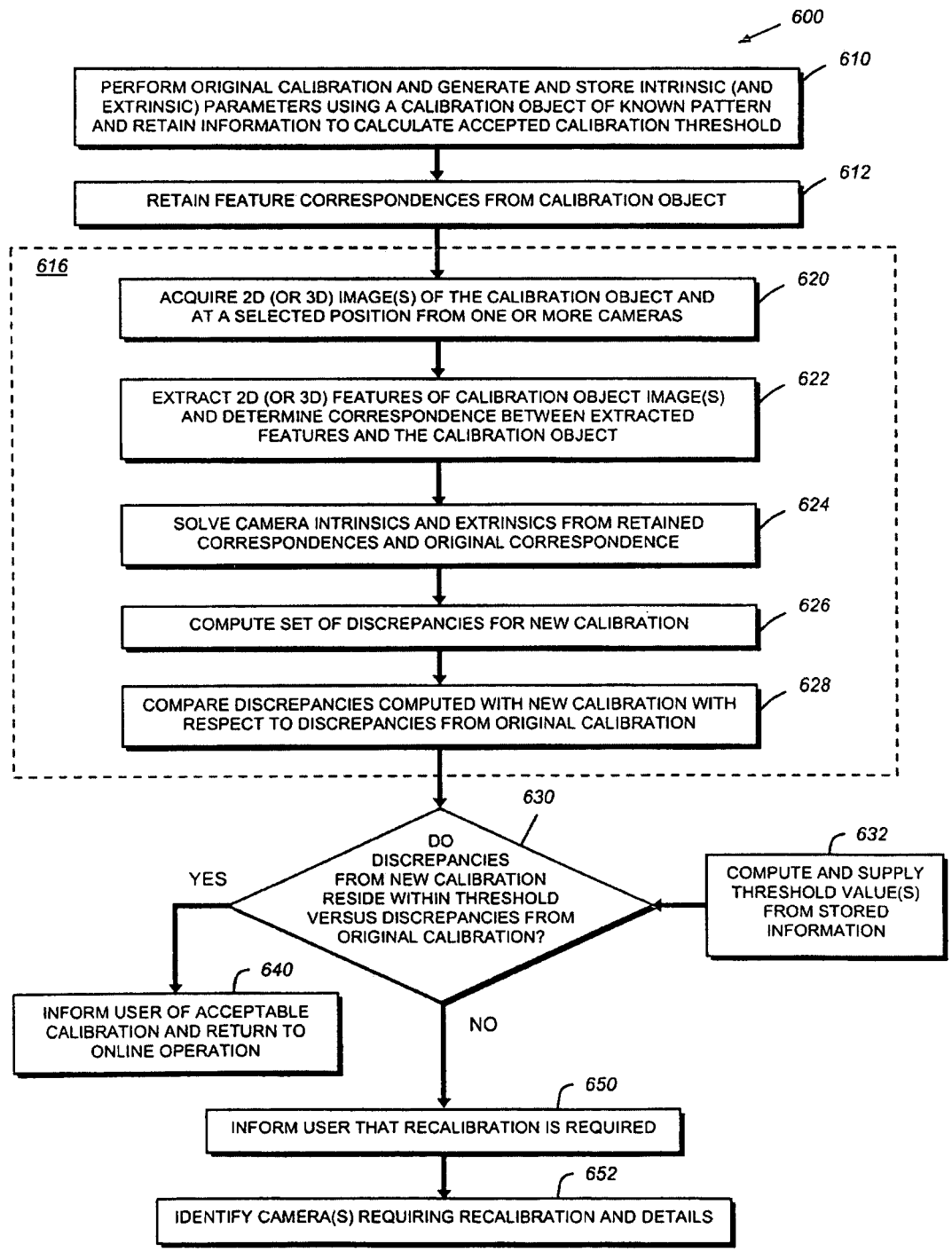
FIG. 6 is a flow diagram of a calibration validation process where the cameras are recalibrated with one or more additional poses of the calibration object, and the calibration parameters are compared to the original calibration parameters, according to an alternate embodiment.

An alternate embodiment for validating calibration of one or more cameras is described with reference to FIG. 6 and generally entails the performance of an initial or original calibration procedure with a predetermined number of calibration object poses, followed by a recalibration with one or more new poses. The calibration and validation process 600 of FIG. 6, thus begins with an original calibration 610 in which the system generates and stores intrinsic and (optionally in the case of multiple cameras) extrinsic parameters for all cameras using a calibration object of known dimension and pattern. Information needed to calculated calibration thresholds and/or error statistics are also retained in this original calibration. As part of the initial calibration procedure, the system stores (for example, in storage location 220 of FIG. 1) feature correspondences with respect to the calibration object that were extracted and computed during the original calibration (step 612).

Subsequently, validation of calibration can occur in response to a user request (or other motivating event) in accordance with the steps defined in box 616. Initially, in step 620 the user places the same, or substantially identically configured, calibration object within the volume space and the system acquires 2D or 3D images of the calibration object at the selected position. This position is typically different from each of the previous multiple positions used during the calibration step. However, the position need not be substantially different from at least one original position in alternate embodiments. Next, in step 622, the validation process extracts 2D or 3D features of the calibration object image or images, and determines a correspondence between the features and the calibration object. At this time, the system has both the original set of feature correspondences with respect to the object at various poses (for example 8 original poses) and a new set of feature correspondences for a new pose (for example, the new $9^{th}$ pose). Given this new larger set of feature correspondences, the validation process undertakes a recalibration step (using 9 poses instead of 8 in this example) in accordance with the same calibration steps described generally above. The new recalibration provides new set of camera intrinsics and extrinsics that may induce discrepancies that vary with respect to the original camera intrinsics and extrinsics. In step 626, the validation process computes discrepancies of the new calibration.

In step 628, the validation process 600 compares the discrepancies for the new calibration with those of the original calibration. Based upon this comparison, the process then determines (decision step 630) whether these discrepancies fall within the acceptable threshold values (computed and input (step 632) as described generally above with reference to FIG. 4). If the compared discrepancies remain within threshold values, then the system indicates an acceptable calibration (step 640) as described above for step 440. Conversely, if the values fall outside threshold limits, then recalibration is needed and the system notifies the user (step 650). The user can also be informed as to the camera(s) in need of recalibration and the details of the problem (step 652) as described above in connection with step 452 of FIG. 4.

The validation steps of box 616 (and other steps herein) can be performed in subsets or groupings of the overall group of a plurality of cameras in accordance with the description of FIG. 5, where appropriate.

The illustrative "recalibration" embodiment described above can require additional processing resources to perform. However, advantageously, it adds at least one additional pose of the calibration object to be acted upon, thereby potentially providing a statistically more-accurate result.

Figure 7:
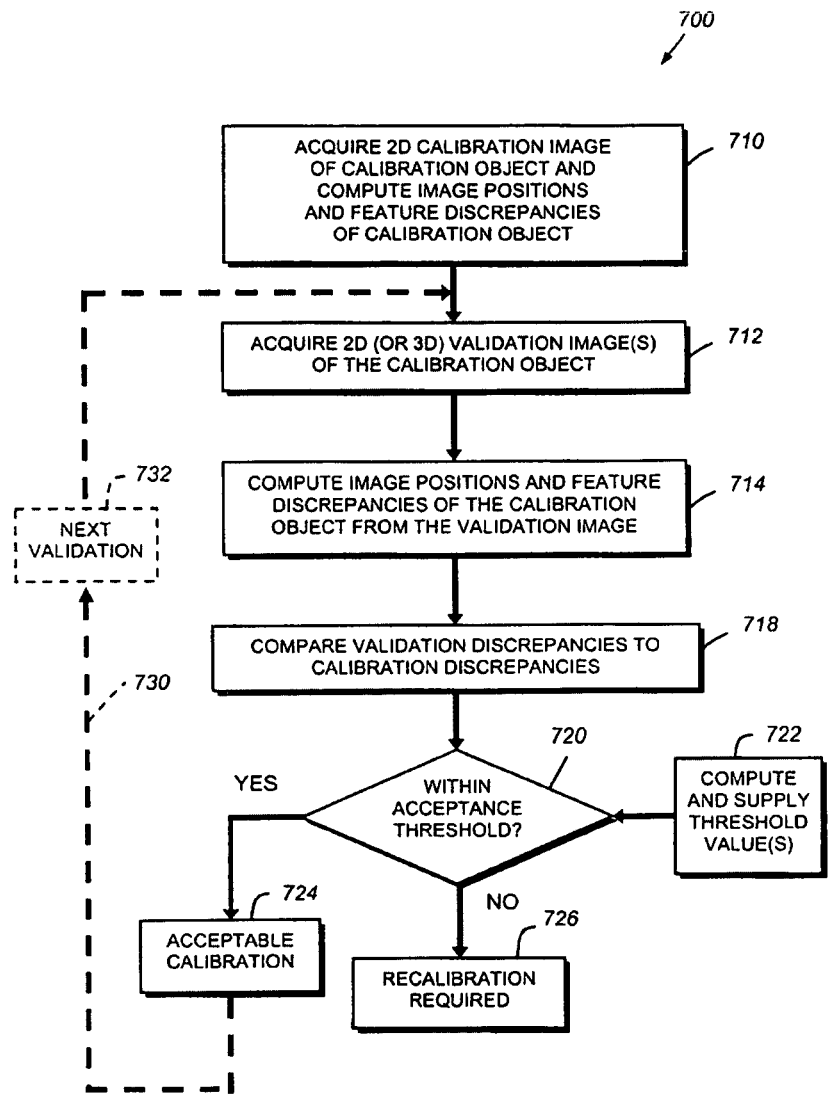
FIG. 7 is a flow diagram of a validation process using a calibration object placed at a known and repeatable location within the scene, and that can occur on an ongoing basis according to an alternate embodiment.

An alternate embodiment for performing the validation process employs physical mechanisms so as to accurately and repeatedly position the calibration object during the calibration and validation procedure (so that the calibration object's pose is accurately known). FIG. 7 describes the process 700 in overview. In this embodiment, the imaged positions of the calibration object occur at known and expected (repeatable) image positions. In accordance with the process 700, during a calibration step, 2D images of the calibration object are acquired. Image positions for features in the calibration image are computed, and feature discrepancies are derived therefrom. During a validation phase, either 2D or 3D images of the object are acquired (step 712) as part of the validation process 700. The validation discrepancies are then computed by comparing the image positions from the validation image to the image positions from the calibration image corresponding to the same physical features (step 714). These validation discrepancies are then compared to calibration discrepancies obtained and stored at calibration time (step 718). If, according to decision step 720, the compared discrepancies fall within desired acceptance threshold values (block 722), then the calibration remains acceptable (block 724). Otherwise, the system requires recalibration (block 726).

One illustrative procedure in accordance with the process 700 for repeatedly positioning the calibration object is to mechanically incorporate (typically in a fixed manner so as to be present during runtime operation) the calibration object (having a checkerboard plate pattern or other known features and dimensions) into the scene such that it could normally be occluded by the runtime object analyzed by the runtime machine vision operation, but would be visible in the acquired image when the runtime object is absent. In this manner, the object is continuously acquired and validation according to the process 700 can occur on an ongoing basis. This illustrative ongoing validation procedure can be triggered by a user, or automatically occur at predetermined time/event intervals. The optional branch 730 (shown in phantom) and corresponding "next validation" step 732 represent an ongoing validation process. In this embodiment the process continues while the calibration remains acceptable (block 724). Alternatively, validation can continue even if an unacceptable calibration is present, Another illustrative technique for performing the validation process 700 is to measure features which are always present in the scene (such as nuts and bolts which are part of a fixture, and are stationary and are always present in each cameras' field of view). In such an embodiment, the constant and stationary features (fixed) can always be measured (in tandem with the machine vision operation) so that the validation operation does not require any additional operator involvement and so that the validation operation can be continually performed. Another illustrative procedure for performing the validation process is to measure features which are stationary and present in the scene when the object to be analyzed is absent (such as nuts or bolts which are environmental elements that define part of a fixture or scene). For the purposes of these embodiments, the "calibration object" includes the predetermined fixed "environmental elements" or features in the scene, as well as a separate calibration device (e.g. a calibration plate) that is removably positioned in the scene.

The foregoing has been a detailed description of illustrative embodiments of the invention. Various modifications and additions can be made without departing from the spirit and scope if this invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. For example, the discrete camera or cameras used herein can be any acceptable type or model of camera, and thus the term "camera" should be taken broadly to include such varied types and styles. For example, the techniques described herein apply to two-dimensional cameras, one-dimensional line scan cameras, CCD cameras, CMOS cameras, those operating in the visible and/or non-visible wavelengths, etc. Moreover, the mechanisms by which cameras are mounted with respect to each other and the volume space are highly variable. In addition, the size, shape and pattern of an object used for calibration and/or validation are variable. In any of the validation processes described herein, it is expressly contemplated that the return of calibration status information (e.g. acceptable calibration or recalibration required) during validation can include specific information of the intrinsic and/or extrinsic parameters measured for various camera in the system as well as the identity of the camera associated with the measurement. In this manner the operators of the system and associated technicians are provided with helpful and potentially time-saving information that can be employed in performing either a partial or full system calibration. Accordingly, this description is meant to be taken only by way of example, and not to otherwise limit the scope of this invention.

What is claimed is:

1. A system for validating calibration of at least one camera in a vision system that images a volume space within a field of view thereof operatively connected to a processor comprising:
 a calibration process performed during vision system set up that generates and stores camera calibration parameters and result statistics based upon calibration images of a first calibration object, the calibration images being captured by the at least one camera during the vision system set up, the first calibration object having a known pattern and dimensions acquired at at least one position within the volume space, the calibration process computing, during the vision system set up, a set of calibration discrepancies between positions of extracted calibration features from the calibration images within the field of view and predicted positions expected of the known pattern of the first calibration object;
 a validation process that, during runtime system operation and subsequent to the calibration process, based on the camera calibration parameters and the result statistics,
 (a) acquires at least one validation image of the first calibration object or a second calibration object having a known pattern and dimensions, (b) extracts validation features of the at least one validation image of the first calibration object or the second calibration object, (c) predicts positions expected of validation features of the first calibration object or the second calibration object using the camera calibration parameters from the calibration images acquired during the calibration process, and (d) computes a set of validation discrepancies between positions of the extracted validation features and the predicted positions of the validation features; and
 wherein the validation process is constructed and arranged to determine whether at least one of the set of calibration discrepancies or at least one of the set of validation discrepancies exceeds an acceptance threshold associated therewith.

2. The system as set forth in claim 1 further comprising a discrepancy comparison process that (a) compares the set of discrepancies computed by the validation process to the set of discrepancies computed by the calibration process, and (b) based upon the comparison, if a predetermined number of the discrepancies of the set of discrepancies computed in the validation process differ in excess of the acceptance threshold from discrepancies of the set of discrepancies computed in the calibration process, indicates a recalibration requirement.

3. The system as set forth in claim 1 further comprising a plurality of cameras that image the volume space within a field of view thereof operatively connected to the processor, and wherein the calibration process further generates and stores extrinsic parameters and result statistics based upon images of the first calibration object and the validation process predicts positions expected of features of the first calibration object or the second calibration object further based upon camera calibration parameters.

4. The system as set forth in claim 3 wherein at least some of the cameras are constructed and arranged to generate 3D images.

5. The system as set forth in claim 4 wherein the at least some of the cameras are arranged as a stereo camera head.

6. The system as set forth in claim 3 wherein at least substeps (a), (b), (c) and (d) of the validation process are performed on the acquired images of the first calibration object or the second calibration object in predetermined subsets of the plurality of cameras.

7. The system as set forth in claim 1 wherein the first calibration object is substantially identical to the second calibration object.

8. The system as set forth in claim 1 wherein the acceptance threshold value is computed based upon statistics generated in the calibration process.

9. The system as set forth in claim 1 wherein the acceptance threshold value is defined based upon application requirements of a runtime vision process of the system.

10. The system as set forth in claim 1 wherein the set of discrepancies is computed based upon image triangulation.

11. The system as set forth in claim 1 wherein the set of discrepancies is computed based upon three-dimensional positions of the extracted features and three-dimensional positions of the expected features.

12. A method for validating calibration of at least one camera in a vision system that images a volume space within a field of view thereof operatively connected to a processor comprising:
(a) generating and storing, in a calibration process performed during vision system setup, calibration parameters and result statistics based upon calibration images of a first calibration object, the calibration images being captured by the at least one camera during the vision system setup, the first calibration object having a known pattern and dimensions acquired at at least one position within the volume space, the calibration process computing, during the vision system setup, a set of calibration discrepancies between positions of extracted calibration features from the calibration images within the field of view and the predicted positions expected of the known pattern of the first calibration object;
(b) in a validation process, performed during runtime system operation and subsequent to the calibration process, acquiring at least one validation image of either the first calibration object or a second calibration object having a known pattern and dimensions;
(c) extracting validation features of the at least one validation image of the first calibration object or the second calibration object;
(d) predicting positions expected of validation features of the first calibration object or the second calibration object using the camera calibration parameters from the calibration images acquired during the calibration process;
(e) computing a set of validation discrepancies between positions of the extracted validation features and the predicted positions of the validation features; and
(f) determining whether at least one of the set of calibration discrepancies or at least one of the set of validation discrepancies exceeds an acceptance threshold associated therewith.

13. The method as set forth in claim 12 further comprising (a) comparing the set of discrepancies computed by the validation process to the set of discrepancies computed by the calibration process, and (b) based upon the comparison, if a predetermined number of the discrepancies of the set of discrepancies computed in the validation process differ in excess of the acceptance threshold from discrepancies of the set of discrepancies computed in the calibration process, indicating a recalibration requirement.

14. The method as set forth in claim 12 further comprising providing a plurality of cameras that image the volume space within a field of view thereof, and in the calibration process, further generating and storing extrinsic parameters and result statistics based upon images of the first calibration object and the validation process predicts positions expected of features of the first calibration object or the second calibration object further based upon camera calibration parameters.

15. The method as set forth in claim 14 wherein, in the validation process, the steps of acquiring, extracting, predicting and determining are each performed on the acquired images of the first calibration object or the second calibration object in predetermined subsets of the plurality of cameras.

16. The method as set forth in claim 12 further comprising defining the acceptance threshold value based upon statistics generated in the calibration process.

17. The method as set forth in claim 12 further comprising defining the acceptance threshold value based upon application requirements of a runtime vision process of the system.

18. The method as set forth in claim 12 further comprising computing the set of discrepancies based upon image triangulation.

19. The method as set forth in claim 12 further comprising computing the set of discrepancies based upon three-dimensional positions of the extracted features and three-dimensional positions of the expected features.

20. A system for validating calibration of at least one camera in a vision system that images a volume space within a field of view thereof operatively connected to a vision processor comprising:
a calibration process that, during vision system setup, generates and stores (i) original intrinsic parameters based upon calibration images of a first calibration object having a known pattern and dimensions acquired at a plurality of positions within the volume space within the field of view and (ii) original feature correspondences with respect to the calibration images of the first calibration object;
a validation process that, during runtime system operation and subsequent to the calibration process,
(a) acquires at least one validation image of either the first calibration object or a second calibration object the same as, or with a pattern and dimensions substantially identical to, the first calibration object (b) extracts validation features of the at least one validation image of the first calibration object or the second calibration object and determines new feature correspondence between extracted validation features and known features of the first calibration object or the second calibration object, (c) generates and stores new intrinsic parameters based upon the stored original calibration feature correspondences from the calibration images acquired by the at least one camera during the calibration process and the new feature correspondences, and (d) computes a set of discrepancies with respect to the new intrinsic parameters relative to the original intrinsic parameters; and
wherein the validation process is constructed and arranged to determine whether at least one of the discrepancies exceeds a predetermined value associated therewith, and if the at least one of the discrepancies exceeds the predetermined threshold to indicate a recalibration requirement.

21. The system as set forth in claim 20 further comprising a plurality of cameras that image the volume space within a field of view thereof operatively connected to the vision processor, and wherein the calibration process further generates and stores original extrinsic parameters based upon images of a first calibration object and the validation process further generates and stores new extrinsic parameters based upon the stored original feature correspondences and the new feature correspondences, and computes the set of discrepancies further with respect to the new extrinsic parameters relative to the original extrinsic parameters.

22. A method for validating calibration of at least one camera in a vision system that images a scene within volume space within a field of view thereof operatively connected to a processor comprising:
(a) in a calibration process performed during vision system setup by providing a calibration image and associated calibration parameters and result statistics including calibration discrepancies between positions of extracted predetermined features from the calibration images and the predicted positions expected of the features within the field of view and associated with calibration using a calibration object, the calibration object being located in the scene at a known and repeatable position in the scene, the calibration image being captured by the at least one camera during the vision system setup; and
(b) in a validation process performed during runtime system operation and subsequent to the calibration process,
(i) acquiring a validation image of the calibration object at the known and repeatable position,
(ii) computing, from the validation image, image positions based upon the calibration parameters from the calibration images acquired during the calibration process and validation discrepancies of the predetermined features of the calibration object, and
(iii) determining whether the validation discrepancies remain within a predetermined acceptance threshold with respect to the calibration discrepancies.

23. The method as set forth in claim 22 wherein the calibration object is fixedly located within the scene at a location that, during a runtime vision process could be partially occluded from view by the at least one camera by an object in the scene being analyzed by the vision process and that is unoccluded when the object is absent from the scene.

24. The method as set forth in claim 23 wherein the validation process occurs in an ongoing basis at predetermined intervals in which the object is absent from the scene.

25. The method as set forth in claim 24 wherein the calibration object comprises fixed environmental elements in the scene.

* * * * *